United States Patent [19]

Delker et al.

[11] 4,157,099
[45] Jun. 5, 1979

[54] LOW NOISE FAUCET

[75] Inventors: Wilfried Delker, Bonn-Beuel; Richard Burg, Neumagen-Dhron, both of Fed. Rep. of Germany

[73] Assignee: American Standard Inc., New York, N.Y.

[21] Appl. No.: 797,539

[22] Filed: May 16, 1977

[30] Foreign Application Priority Data

May 19, 1976 [DE] Fed. Rep. of Germany ....... 2622179

[51] Int. Cl.² .................. F16K 11/00; F16K 47/02
[52] U.S. Cl. .................. 137/625.17; 137/550; 251/127; 137/625.4
[58] Field of Search .............. 137/625.17, 545, 550, 137/636.4, 625.4; 251/127, 118

[56] References Cited

U.S. PATENT DOCUMENTS

| | | | |
|---|---|---|---|
| 2,380,597 | 7/1945 | Hess | 137/550 X |
| 3,763,879 | 10/1973 | Jaworek | 137/550 X |
| 3,893,482 | 7/1975 | Loose | 137/625.17 |
| 3,920,043 | 11/1975 | Fowell | 137/625.17 |

*Primary Examiner*—William R. Cline
*Attorney, Agent, or Firm*—James J. Salerno, Jr.; Robert G. Crooks

[57] ABSTRACT

An improved water faucet having a valve body with control elements formed by two discs wherein the first disc is stationary and has water inlet openings and an outlet opening, connected on one side to a valve manifold. The other side is directed toward the second disc, which is movably arranged on the first disc. The second disc has a surface cavity overlapping the inlet openings and outlet opening of the first disc. A noise reducing assembly including a plurality of overlapping screens is disposed within the surface cavity of the second disc. The assembly includes a plurality of overlapping screens with at least one protrusion extending from the screens into the flow passageway between the inlet and outlet openings while maintaining a free minimum passageway to thereby reduce the noise level during operation of the water faucet.

10 Claims, 7 Drawing Figures

LOW NOISE FAUCET

BACKGROUND OF THE INVENTION

This invention relates to mixing faucets and particularly the present invention represents improvements of the faucet and valve disclosed in U.S. Pat. Nos. 3,433,264; 3,533,436; 3,893,482 and 3,920,043.

In general, this invention relates to a water faucet which employs a valve body with control elements formed by two discs. The first disc is stationary and has water inlet openings and a water outlet opening connected on one side to a valve manifold and on the other side is directed toward the second disc which is movably arranged on the first disc. The second disc has a surface cavity arranged and constructed to overlap the inlet openings and the outlet opening formed in the first disc. A noise reducing assembly is disposed within the surface cavity of the second disc and includes one or several screens spaced from the surface of the first disc so that there is a flow passage between the surface of the first disc and the screen or screens.

Experience has shown that these designs, well tried in principle, can be a bit noisy because they have to deal with comparatively high flow speeds and turbulences at the control edges in the region of the passageway from the inlet apertures of the first disc into the surface cavity due to the small operating passageways.

As shown in the above-referenced patents, screen arrangements in the surface cavity have considerably reduced the noise. The former hard impact of the water-jets on the bottom of the surface cavity is avoided by dispersing the jets by means of the screen arrangement producing a stablization in the region where the water flow is reversed or redirected significantly reducing the noises caused by the valve body and water sounds.

It is submitted that even with the developed state of the art there is still room for reduction in noise level particularly during the throttling and closing phases and in the mixing positions.

SUMMARY OF THE INVENTION

The present invention provides a structure which provides further noise reduction in the conditions as stated above and which is designed for a safe mode of operation with a very simple structural design.

This aim has been reached advantageously primarily by providing one or several protrusions, made of perforated or non-perforated material. The protrusions are located in the flow passageway between the face of the first disc and the screens in the flow-longidutinal direction or diagonally to the direction of flow while maintaining a free minimum flow passageway. The protrusions can be formed of screen material.

In one form of the invention, the protrusion is in the shape of a rib or a similar elongated longitudinal member centrally located in the flow passageway in the longitudinal direction and extending from one point between the inlet openings to the outlet opening. This divides the flow passageway into two sections which link the associated inlet openings to the outlet opening in the most direct manner. This design avoids, on the one hand, having the hard water-jets entering the flow passage and colliding and, on the other hand, provides for conducting the quantity of water running through the passageway to the outlet opening in a manner which is advantageous in regard to the flow.

The one or more protrusions provides a braking effect and thus a redamming pressure behind the first disc. The redamming pressure is the pressure which works behind the first disc against the disc to balance pressure loss. This effect leads to a stabilization of the flow in the region of the inlet openings in the first disc without having a considerable pressure loss.

The protrustions, made preferably of a screen material, do not provide any substantial resistance for the entering quantities of water. Thus the advantages, presented in the known designs where one or several filters are in the surface cavity of the second movable disc spaced from the adjacent face of the first or non-movable disc, are retained as well as the advantages presented by the present design. Partial quantities of the water are dispersed in the flow passageway of the present structure causing a flow stabilization in that passageway as well.

It is also an objective of the present invention to provide an arrangement where one or several protrusions are shaft or rib-shaped in configuration and the elongated longitudinal protrusions are arranged diagonally in the flow passageway to the longitudinal direction of flow.

Other alternative forms of the invention include protrusions which are integrally formed as one piece with the screen and face the adjacent surface of the first disc and can be formed as protrusions on the exposed screen surface which faces the adjacent surface of the first disc.

In another form of the invention, the screen facing the first disc is arranged in the surface cavity so that it is spaced from the bottom of the cavity and rests in either a spacing holder in the form of a filter basket, U-shaped in configuration, or the screen itself is designed in the form of a screen basket having its open end resting on the base of the surface cavity.

The use of the screen basket has an independent advantage. When manufacturing ceramic parts, maintaining tolerances is difficult and accordingly, often a greater tolerance range than is desirable cannot be avoided. Therefore, it is possible when manufacturing the movable discs that the surface cavity has a comparably small depth. In such a case, the screen basket is only pressed together automatically in the surface cavity to a corresponding variable depth so that the flow passageway between the first disc and the screen arrangement always has the same height.

The water faucet constructed according to the present invention provides for considerably less noise during the throttling and closing phases and in the mixing positions in operation of the faucet than was previously available. The cost of manufacturing and assembling the noise reducing assembly particularly the production of the screen and protrusion arrangement is very low.

DESCRIPTION OF THE PREFERRED EMBODIMENT

Figure 1:
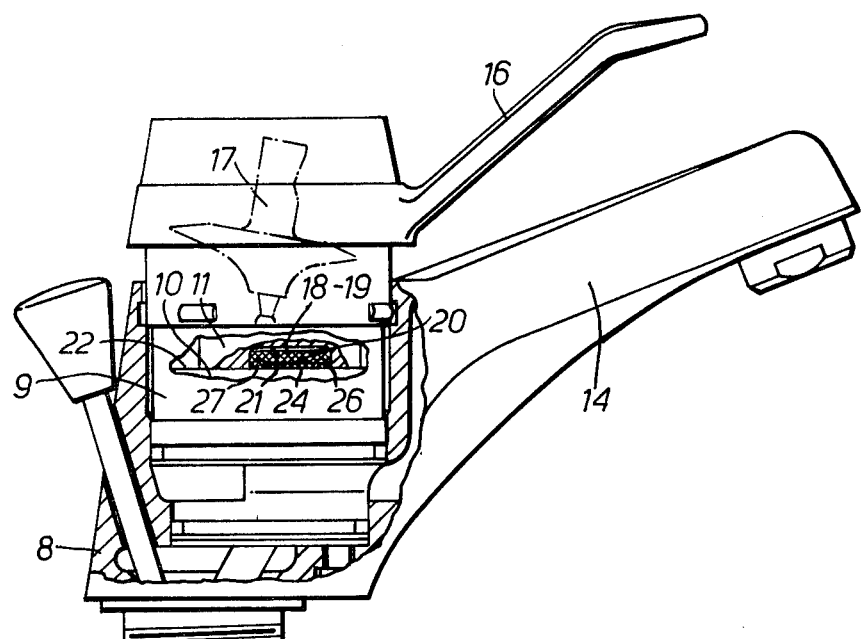
FIG. 1 illustrates a water faucet in the form of a mixing valve partially in longitudinal section including noise reducing means disposed in the movable disc.
Figure 2:
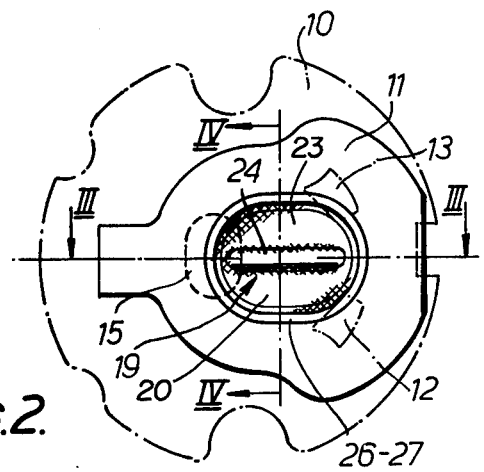
FIG. 2 is a top plan view of the movable disc portion thereof with the non-movable disc shown in phantom.
Figure 3:
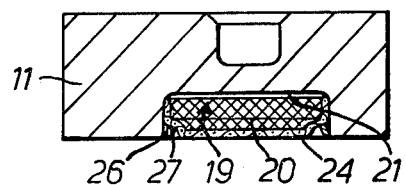
FIG. 3 is a sectional elevation view thereof through the movable disc taken along the plane of line III—III of FIG. 2.
Figure 4:
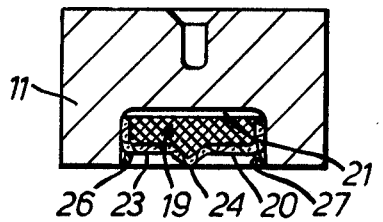
FIG. 4 is a sectional elevation view thereof taken along the plane of line IV—IV of FIG. 2.

Water faucet body 8 mounts and houses the mixing valve in the form of a casing or cartridge 9 which includes control elements formed by two discs 10 and 11. Disc 10 is non-rotary, and it has two inlet apertures 12, 13 for cold and warm water respectively and an outlet aperture 15 for the mixed water leading to an outlet 14. Disc 11 is arranged to be displaced and swivelled on disc 10 by a control lever 17 connected with a handle 16. Disc 11 has a surface cavity 18 for mixing and reversing functions which can be overlapped with the inlet apertures 12, 13 and with the outlet aperture 15 in different degrees.

A screen basket 19 is placed in the surface cavity 18. The bottom 20 of screen basket 19 is spaced from the bottom of cavity 18 on one hand and is spaced from the adjacent face 22 of non-movable disc 10 on the other hand so that there is a flow passage 23 between the valve seat face 22 and the screen bottom 20.

In operation, the hard water jets passing through the inlet openings 12, 13 of the non-movable disc 10 are dispersed by the screen basket 19 on their way into the surface cavity 18 and accordingly to the reversing region. A hard impact of the water jets on bottom 21 of the surface cavity 18 is avoided in this manner and a soft water flow is reversed causing a considerable reduction in noise.

A further considerable noise reduction in the throttling and closing phases and in the mixing positions is obtained by providing one or several protrusions or baffles 24, 25 in the longitudinal direction of flow or diagonally to it in the flow passageway between the valve seat face 22 and the bottom 20 of screen basket 19 while maintaining a free minimum passageway therethrough. The impediments, baffles or protrusions 24, 25 also can consist of a screen material and can be formed in one integral piece with the screen basket 19 and shaped into the desired protrusion configuration. The protrusions are of perforated material to permit passage of water therethrough. Alternatively, they can be unperforated material so that water passes therearound.

In the embodiment of FIGS. 1–4 a protrusion 24, centrally positioned and shaped as a hollow rib or elongated longitudinal member, is placed in the flow passage 23 in the longitudinal direction. The protrusion 24 extends from one point between the inlet apertures 12, 13 to the outlet aperture 15. In this manner, the flow passage is divided into two sections which connect the inlet apertures 12, 13 with the outlet aperture 15 in the most direct manner.

A protrusion, designed and arranged in this way, can avoid, on the one hand, collision of the hard water jets coming into the flow passageway and, on the other hand, can assure that the quantity of water running through the passage 23 is conducted to the outlet aperture in the most favorable and unimpeded fashion with respect to the flow direction.

Figure 7:
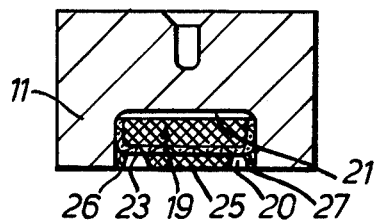
FIG. 7 is a sectional elevation view thereof taken along the plane of line VII—VII of FIG. 5.
Figure 5:
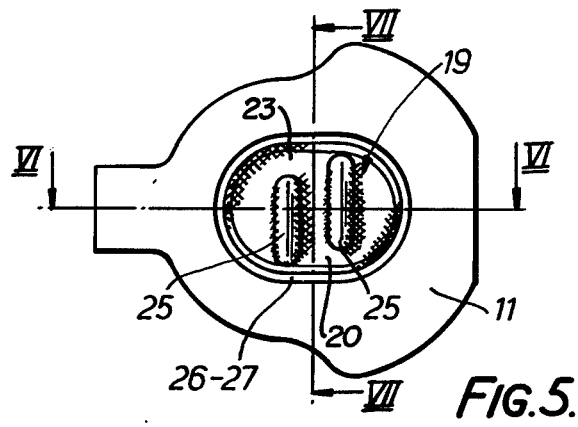
FIG. 5 is a top plan view of an alternative embodiment of the movable disc portion of the water faucet of the invention.
Figure 6:
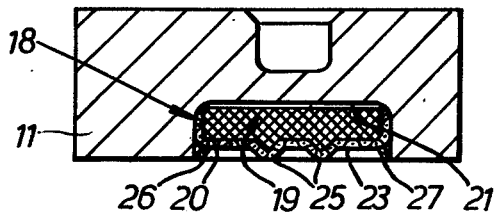
FIG. 6 is a sectional elevation view thereof taken along the plane of line VI—VI of FIG. 5.

In the embodiment of FIGS. 5–7, there are two protrusions 25 in the flow passage 23 which are arranged diagonally to the longitudinal direction of flow. Each protrusion 25 has a rib-shaped or elongated longitudinal design configuration and are off-set with respect to one another. However, it is possible to arrange the protrusions in aligned relationship one behind the other.

Protrusions 25 cause a braking effect and thus a redamming pressure behind the valve seat. The redamming pressure is the pressure which works, in the direction of the water flow, behind the valve seat against this seat to balance pressure loss. This leads to a flow stabilization in the region of the inlet openings 12, 13 in the first disc 10 without a considerable pressure loss. This effect is additionally obtained by means of the protrusion 24.

The distance or spacer ring 26 serves for securing the position of the screen basket 19 on the one hand, and it favorably influences the flow-course on the basis of its inclined wall 27 on the other hand.

Conventionally, the screens and protrusions can be formed of a conventional metal, such as stainless steel, or plastic screening material and the discs can be formed of a material such as ceramic, molded plastic, matals or the like.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. In a water faucet having a valve body with control elements formed by two discs, the first disc being stationary and having water inlet openings and a water outlet opening connected on one side to a valve manifold and on the other side directed toward the second disc which is movably arranged on the first disc, the second disc having a surface cavity arranged and constructed to overlap the inlet openings and the outlet opening formed in the first disc, the improvement comprising:

a noise reducing assembly disposed within the surface cavity of the second disc and including at least one integrally formed screen basket and at least one protrusion being in the form of a raised section of screen which extends towards the first disc into the flow passageway between the inlet and outlet openings while maintaining a free water flow passageway between said raised section, said screen and said stationary disc to thereby reduce the noise level during operation of the water faucet.

2. The water faucet in accordance with claim 1 wherein said raised section is in the form of an elongated rib and is integrally formed with said screen basket.

3. The water faucet in accordance with claim 2 wherein said elongated rib extends diagonally to the longitudinal flow direction through the flow passageway.

4. The water faucet in accordance with claim 1 wherein said noise reducing assembly is in the form of a U-shaped screen basket mounted in the cavity and a spacer ring mounted in said cavity adjacent its open outer end to maintain said noise reducing assembly in fixed position within said cavity.

5. The water faucet in accordance with claim 1 wherein the noise reducing assembly includes a screen in the form of a basket having its open end resting on the bottom of the cavity of the second disc and a spacer ring mounted in said cavity adjacent is open outer end to maintain said noise reducing assembly in fixed position.

6. A noise reducing assembly arranged and constructed for mounting in a water faucet having a valve body with control elements formed by two discs, the first disc being stationary and having water inlet openings and a water outlet opening connected on one side to a valve manifold and on the other side directed toward the second disc which is movably arranged on the first disc, the second disc having a surface cavity adapted to be in fluid communication with the inlet openings and the outlet opening formed in the first disc, said noise reducing assembly comprising:

at least one integrally formed screen basket disposed within the surface cavity of the second disc, and at least one protrusion being in the form of a raised section of screen which extends towards the first disc into the flow passageway between the inlet and outlet openings while maintaining a free minimum flow water passageway between said raised section; said screen and said first disc to thereby reduce the noise level during operation of the water closet.

7. The noise reducing assembly in accordance with clain 6 wherein said raised section is in the form of an elongated rib and is integrally formed with said screen basket.

8. The noise reducing assembly in accordance with claim 7 wherein said elongated rib extends diagonally to the longitudinal flow direction through the flow passageway.

9. The noise reducing assembly in accordance with claim 6 wherein said noise reducing assembly is in the form of a U-shaped screen basket mounted in the cavity and a spacer ring mounted in said cavity adjacent its open outer end to maintain said noise reducing assembly in fixed position within said cavity.

10. The noise reducing assembly in accordance with claim 6 wherein the noise reducing assembly includes a screen in the form of a basket having its open end resting on the bottom of the cavity of the second disc and a spacer ring mounted in said cavity adjacent its open outer end to maintain said noise reducing assembly in fixed position.

* * * * *